March 7, 1933.  G. J. MEAD  1,900,456
TIRE VULCANIZER
Filed March 22, 1930  6 Sheets-Sheet 1

Fig. 1.

INVENTOR.
George J. Mead.
BY
ATTORNEY.

March 7, 1933.  G. J. MEAD  1,900,456
TIRE VULCANIZER
Filed March 22, 1930  6 Sheets-Sheet 4

INVENTOR.
George J. Mead.
BY
ATTORNEY.

March 7, 1933.　　　　　G. J. MEAD　　　　　1,900,456
TIRE VULCANIZER
Filed March 22, 1930　　　6 Sheets-Sheet 5

INVENTOR.
George J. Mead.
BY
ATTORNEY.

March 7, 1933. G. J. MEAD 1,900,456
TIRE VULCANIZER
Filed March 22, 1930   6 Sheets-Sheet 6

INVENTOR.
George J. Mead.
BY
ATTORNEY.

Patented Mar. 7, 1933

1,900,456

UNITED STATES PATENT OFFICE

GEORGE J. MEAD, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE VULCANIZER

Application filed March 22, 1930. Serial No. 438,109.

My invention relates to vulcanizing molds for rubber articles, such as pneumatic tire casings or tubes.

It is an object of my invention to provide a unitary vulcanizing arrangement consisting of a plurality of vulcanizing molds by means of which a single operator may perform all necessary operations on all the molds of the unit at a single point. Another object is to provide an automatic timing mechanism for opening and closing the molds and for moving the mold to and from the mold opening and closing positions. Other and further objects will be apparent from the following specification and claims.

In the accompanying drawings which illustrate one embodiment of my invention.

Referring to the drawings a turn-table 20, pivotally mounted about a hub 21, is adapted to support a number of tire molds 22, the lower portion 23 of each mold being fixed to the turn-table 20 as by screws 25. A circular rail 26 fixed to the underside of the turn-table 20, preferably directly below the molds 22, rides on a number of freely rotatable wheels 27 journaled in brackets 29 fixed to a frame 30.

A super-structure 31 mounted on the base frame 30 and extending over the turn-table 20 has, at one end of the structure and directly over the path of the molds 22 on the turn-table, mechanism for unlocking the molds, mechanism for removing the upper half of the molds from the lower, and mechanism for positioning tire casings in the open lower mold halves. This mold servicing mechanism will be later more fully described.

The turn-table 20 is rotated intermittently in such a manner that at each intermittent movement a mold is positioned beneath the mold servicing mechanism. As shown in the drawings, adjacent molds are successively moved into servicing position but alternate molds may be successively brought into position if desired. In the latter case an odd number of molds would be required in order that each mold may be operated upon, whereas in the first case either an odd or even number of molds may be used.

Figure 7:
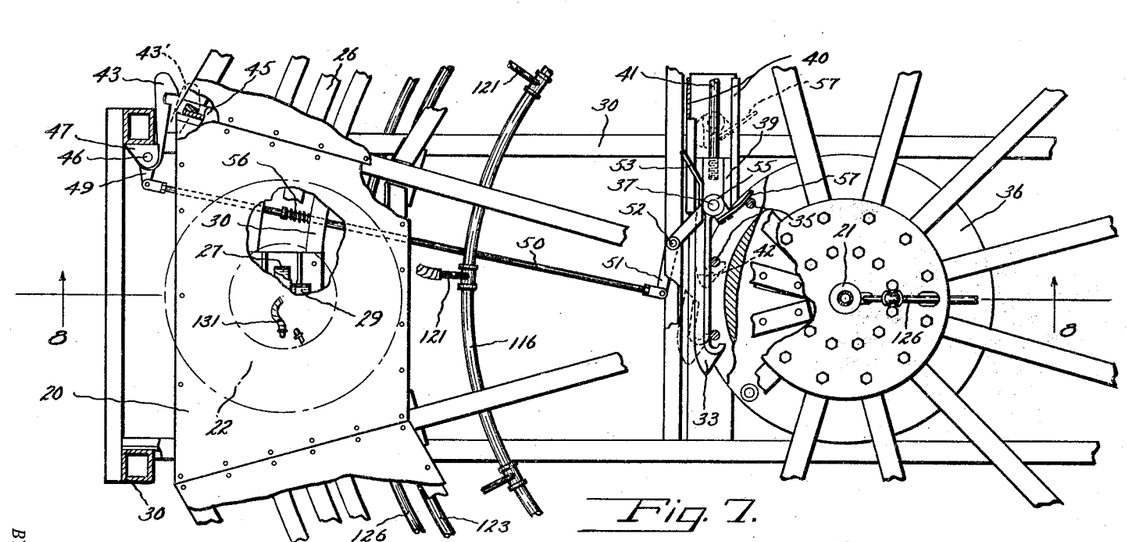
Fig. 7 is a detail view showing the operation of the turn-table locking and indexing mechanism with certain parts broken away.

The turn-table 20 is rotated by a fluid pressure cylinder 32 operating through a hook 33 engaging pins 35 in a member 36 fixed to the hub 21 of the turn-table (see Fig. 7). The hook 33 is pivotally mounted at 37 on a block 39 slidable in ways 40 and operably connected to the piston rod 41 of the cylinder 32. To operate, pressure is admitted to the front of cylinder 32, thus causing the hook 33, then in position shown by full lines in Fig. 7, to move backward. The hook 33 will engage with one of the pins 35, thus drawing the member 36, in which the pins are held, in a clockwise rotation. The member 36, being fixed to the hub 21 of the turn-table 20, rotates the whole unit.

The hook 33 moves a distance indicated by dotted lines 42 drawing the turn-table 20 with it. Due to the momentum given such a large body the turn-table has a tendency to continue rotating even though no longer under the influence of the hook 33. In order to arrest this movement I have provided a catch 43 (Fig. 7) adapted to engage the turn-table at one of its frame members 45. The catch 43 is pivotally mounted on a shaft 46 in a bearing 47 fixed to the frame 30. The shaft 46 is operably connected through links 49, 50 and 51 to another shaft 52 on which is fixed an arm 53 adapted to ride against the hub 55 of the hook 33. The arm 53 is yieldably held against the hub 55 by a compression spring 56 on link 50.

At the start of the indexing of the turn-table 20 (full line position in Fig. 7) the catch 43, through its linkage, has been moved free from the turn-table. Before completion of the operative stroke of the hook 33 its hub 55 engages the bent portion of the arm 53, permitting the catch 43 under the influence of spring 56 to move to the dotted line position 43′ so that the next rib in the turn-table engages the catch 43 and brings the turn-table to a stop in desired position.

After the turn-table 20 has been stopped in its movement fluid pressure may be admitted to the back of cylinder 32, thus returning the hook 33 in readiness for the next indexation. The operation of cylinder 32 is preferably controlled by a timing mechanism as later described. In returning to this position the hook 33 must ride over the pin it is to engage (dotted lines 33′ in Fig. 7), and in order to insure its return to pin engaging position I have fixed a strip of spring material 57 to the hub 55 of the hook, the spring material engaging with one of the pins 35 and thus pivoting the hook into pin engaging position.

Figure 1:
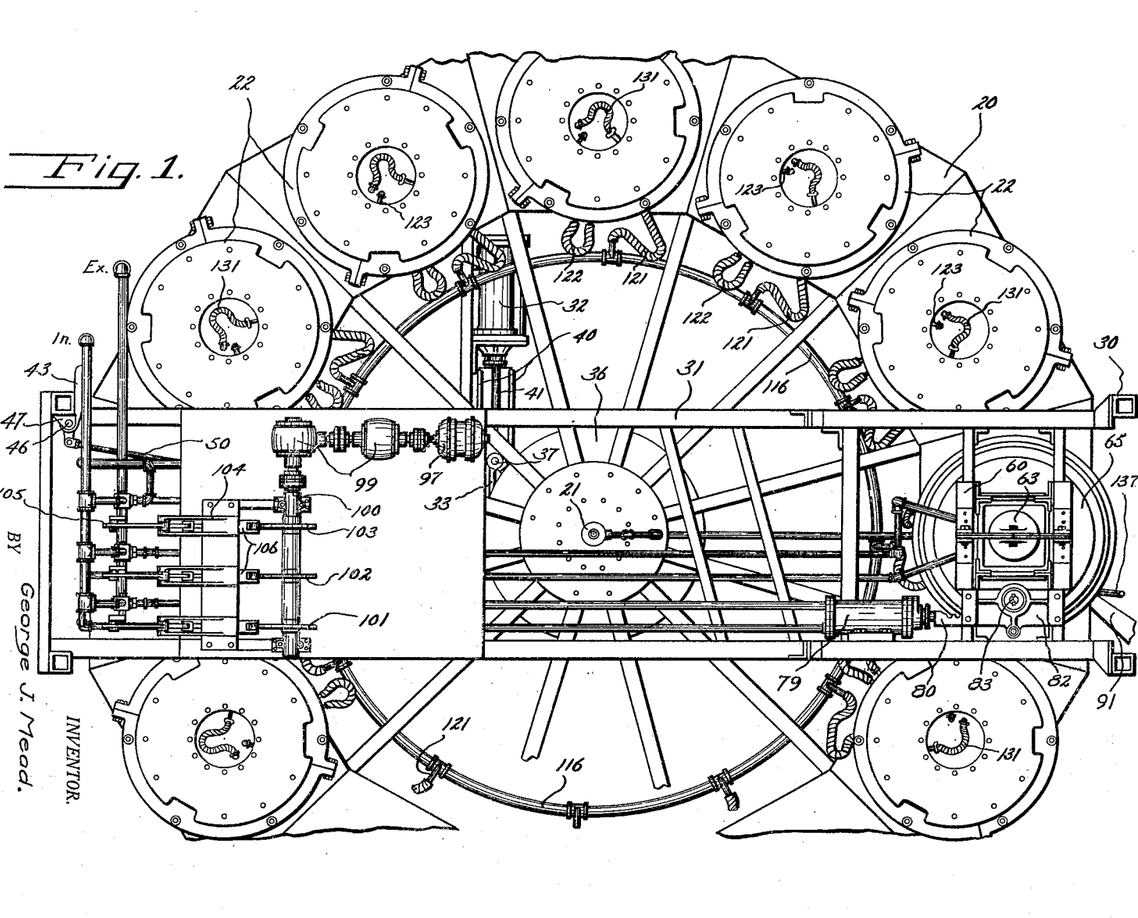
Fig. 1 is a general plan view of the tire vulcanizer with parts broken away.
Figures 2, 3, 4, 5:
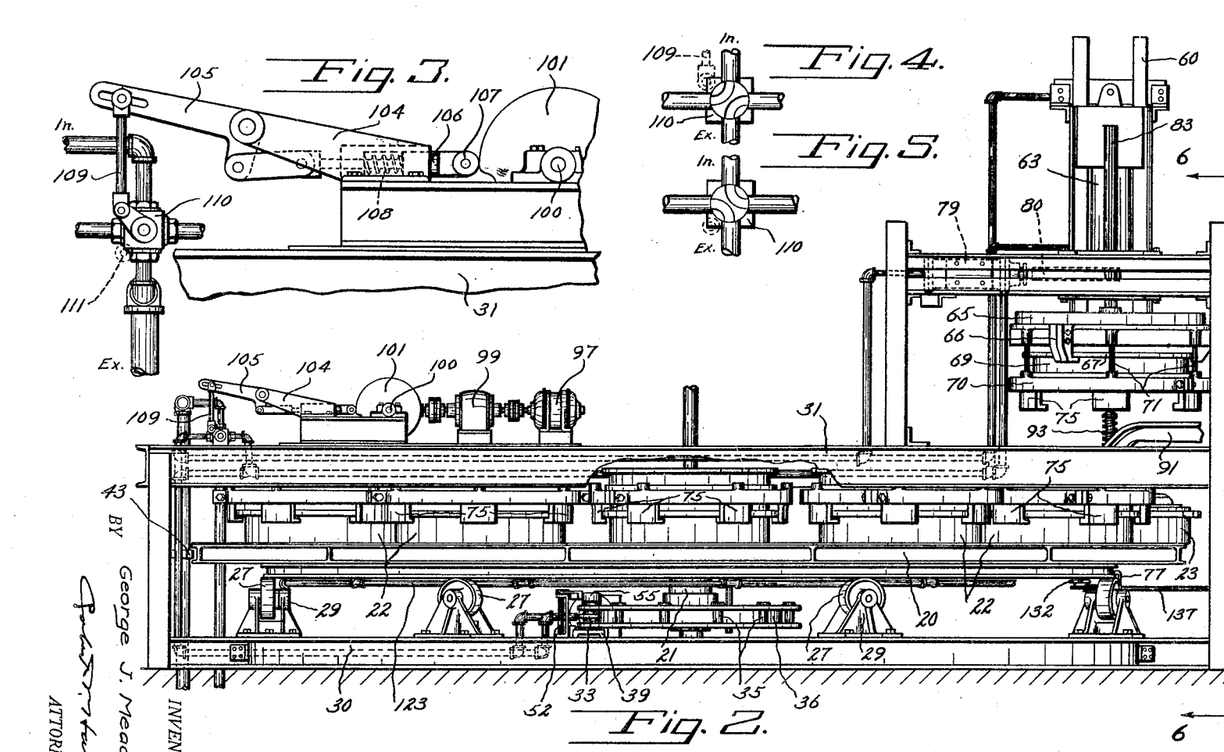
Fig. 2 is a side elevation of the structure shown in Fig. 1 with a portion of the frame broken away.
Fig. 3 is an enlarged scale view of the valve operating mechanism shown in Fig. 2.
Figs. 4 and 5 are detail views showing the operation of the valves.

The mechanism for handling the upper mold halves and for positioning an uncured casing in the molds will be described with special reference to Figs. 1, 2 and 6. This mechanism is carried by a framework 60 erected on the super-structure 31 and comprises an inner ram-plate 61 fixed to the piston rod 62 of a cylinder 63 mounted in the framework 60. An outer ram-plate 65 rotatably held on the inner ram-plate 61 is provided with a series of hooks 66 adapted, when the ram-plates are brought adjacent the mold 22 under the action of the cylinder 63, to engage, as later described, with a flange 67 on the upper mold section 69, the flange 67 being provided with openings 115 through which the hooks may pass.

The upper section 69 of each mold 22 is normally held to the lower section 23 by means of a mold locking ring 70 which may be carried by either the upper or lower section but is shown as carried by the upper section 69, ring 70 being provided with hooked lugs 75 adapted to interlock with lugs 73 on the lower mold member. Before the section 69 is removed from section 23 the ring 70 must be partially rotated to unlock the sections. For this purpose I have provided the outer ram-plate 65 with a number of studs 71 which are adapted to fit into holes 72 in the lock ring 70 when the ram-plates are brought into position to lift the upper mold section 69 from the lower section 23. The lock ring 70, as will be clear from the drawings, must be given a partial rotation to release the pressure of the hooked lugs 75 of lock ring 70 on the mating lugs 73 on the lower mold section 23, and to bring hooks 75 to notches or spaces 76 through which the hooks 75 may be drawn. To do this I give the outer ram-plate 65 a partial rotation after locating the studs 71 in the holes 72 in the ring 70.

Mounted on the framework 60 is a fluid pressure cylinder 79 operating a rack 80 constantly in mesh with a gear 81 in a member 82 secured to the framework 60. Gear 81 is splined on a shaft 83 journaled in and reciprocable with the inner ram-plate 61. Fixed to the shaft 83 adjacent the ram-plate 61 is another gear 84 constantly in mesh with an internal gear segment 85 fixed to the outer ram-plate 65. Thus it will be seen that, by means of the action of the cylinder 79 and irrespective of the vertical position of the ram-plates 61 and 65, the outer ram-plate 65, and with it pins 71, may be partially rotated about the inner ram-plate 61 a sufficient amount to unlock the ring 70.

The general operation of the parts so far described may be summarized as follows. With the turn-table brought to rest with a mold beneath the servicing devices cylinder 63 is operated to lower the ram-plates 61 and 65 and the parts associated therewith. As the plates move downward hooks 66 pass through openings 115 in flange 67 of the upper mold half and pins 71 enter holes 72 in the locking ring 70. Cylinder 79 is now operated to advance rack 80, which, through gear 81, shaft 83, gear 84, and gear 85, partially rotates ram-plate 65 to disengage the mold locking lugs 73 and 75 and move lifting hooks 66 under flange 67. When cylinder 63 is now operated to raise the ram-plates the lugs 66 engage flange 67 to break open the mold and raise the upper mold half, as shown in Fig. 6, the locking lugs 75 of the upper mold member passing through spaces 76 between the locking lugs 73 of the lower mold member. It may be found of advantage to make the lifting hooks 66 on one side slightly shorter so that one side of the mold is "broken" slightly in advance of the other side. The force necessary for breaking open the mold is substantial and I therefore provide a hook 77 (Figs. 2 and 6) secured to frame 30 which slidably engages rail 26 of the turn-table at a point below the opening mechanism so that the opening pull is more directly transmitted to the frame.

The mold having been thus opened, the cured tire is removed, the mold lubricated or otherwise treated as desired, and a raw tire placed in the mold. In the form of mold shown, separate bead rings 87 are employed. These may be placed on the raw tire and bolted together before the tire is placed in the mold. Preferably, however, I position the bead rings on the tire in the mold. In this case the lower bead ring is first laid in the lower mold (or it may be made integral with the mold), the tire put in place and the upper bead ring laid in position, as shown in Fig. 6, and forced into position by means now to be described.

A bracket 86 is fixed to the center of the inner ram-plate 61 and is adapted to engage with a bead ring compressor for fitting a bead ring 87 in place on the uncured casing 89 before the upper mold section 69 is replaced on the lower section 23. The bead ring compressor comprises a bracket 90 held in an arm 91 by means of a pin 92. A spring 93 about the pin 92 normally holds the bracket 90 raised from the lower mold section and tire casing. The arm 91 is pivotally held in a bracket 95 fixed to the super-structure 31, a pin 96 in the bracket being adapted to assist in locating the arm 91 in desired position. When the compressor is to be used it is swung over the mold section 23, which as previously described has been provided with a tire casing 89 and bead ring 87, and the ram-plates actuated downward. The center bracket 86 will engage with the pin 92, thus compressing the spring 93 and forcing the bracket down on the bead ring 87. The ram-plates are now raised and the arm 91 and associated parts swung to inoperative position. The ram-plates are then again lowered, this time to close the mold members, and rack 80 is returned to its original position to rotate the locking ring 70 into locking position and to disengage lifting hooks. The turn-table is then advanced to present another mold to the servicing device.

The operation of the three cylinders used in the vulcanizer; namely, the turn-table cylinder 32, the ram-plate cylinder 63, and the lock ring cylinder 79, is accomplished automatically by a timing mechanism (see Figs. 1 to 5). This mechanism is mounted on the super-structure and is operated by a constant speed motor 97 through speed reducing units 99 connected to a cam shaft 100 carrying cams 101, 102 and 103, one for each cylinder as later described. A bracket 104 fixed to the super-structure 31 in line with the cam shaft 100 carries bell cranks 105 operably connected to slides 106 having rollers 107 engaging the cams 101, 102 and 103. Compression springs 108 acting on the slides 106 hold the rollers 107 constantly against the cams. An adjustable link 109 connects each bell crank 105 with a valve 110 for operating the cylinders, the full line position in Fig. 3 (Fig. 4) admitting the fluid pressure to one end of the cylinders and the dotted line position 111 in Fig. 3 (Fig. 5) admitting the pressure to the other end of the cylinders.

Figures 9, 15, 16:
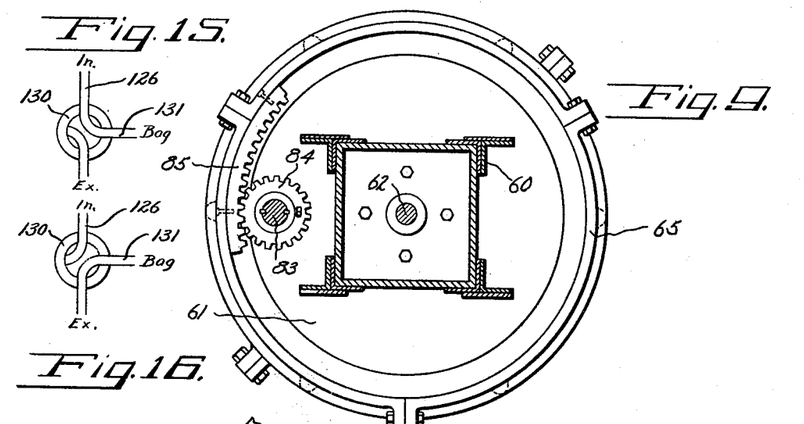
Fig. 9 is a section taken substantially on line 9—9 of Fig. 6.
Figs. 15 and 16 are detail views showing the operative positions of the airbag valves.
Figure 10:
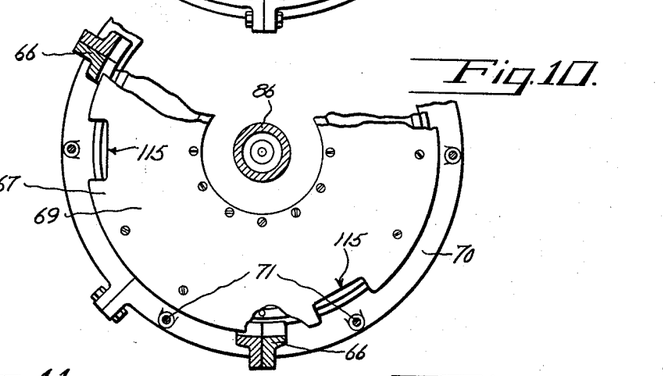
Fig. 10 is a section taken substantially on line 10—10 of Fig. 6.
Figure 11:
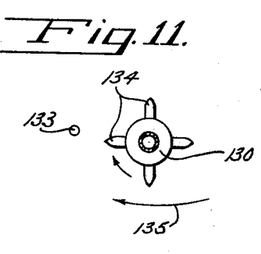
Fig. 11 is a detail view of the valve mechanism for relieving the pressure in the airbag just previous to the operation of the said valve.
Figures 12, 13:
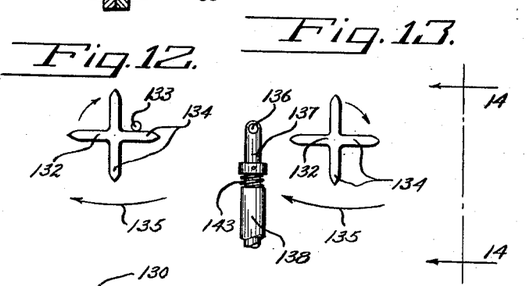
Fig. 12 is a similar view just after the operation of the valve to shut off the pressure and open the bag to the exhaust.
Fig. 13 is a similar view showing the position of the valve at the mold opening and closing station and a valve operating arm positioned to open the valve.
Figure 14:
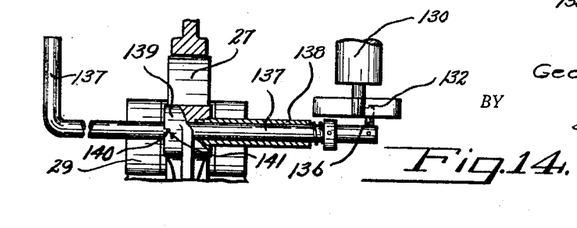
Fig. 14 is a detail view taken substantially on line 14—14 of Fig. 13.
Figure 17:
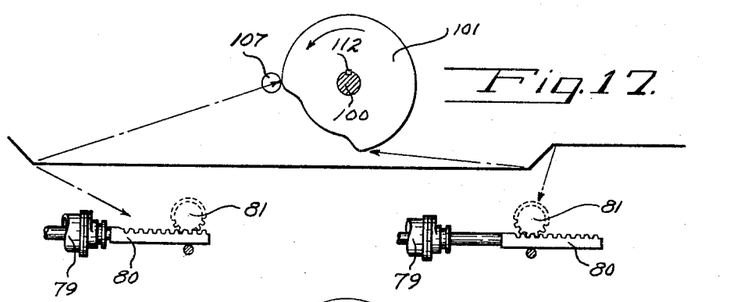
Fig. 17 is a view of the cam for operating the mold locking and unlocking cylinder valve and a diagrammatic representation of its operation.
Figure 18:
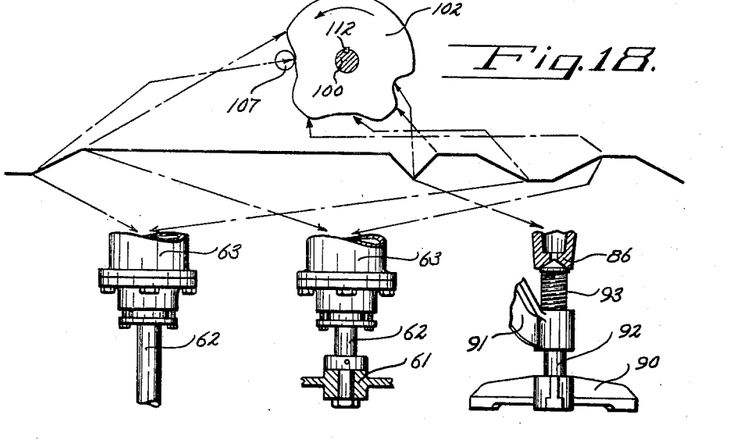
Fig. 18 is a view of the cam for operating the mold pick-up and ram-plate cylinder valve and a diagrammatic representation of its operation.
Figure 19:
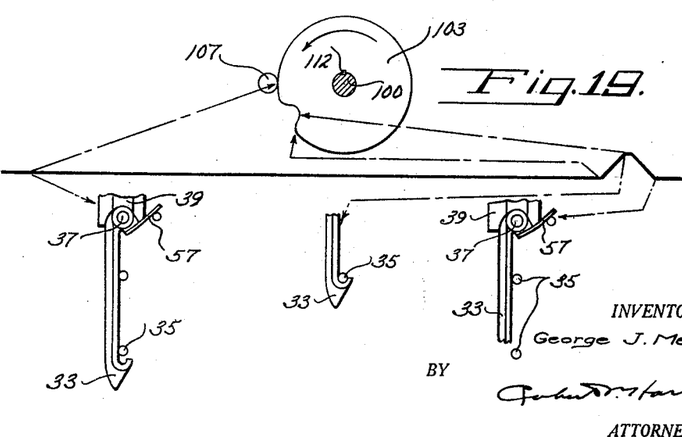
Fig. 19 is a view of the cam for operating the turn-table indexing valve and a diagrammatic representation of its operation.

The cam movements are diagrammatically described in Figs. 15, 16 and 17. In these figures it will be seen, by reference to the key 112 that the position of the cams 101, 102 and 103 are taken with the shaft 100 in the same position. Assuming a mold in position under the servicing device, cam 102 operates to lower the ram-plates. The piston in cylinder 79 is now retracted by operation of cam 101 to rotate lock ring 70 to unlock the mold and move the lifting hooks 66 into position. The turn-table indexing hook 33 is at rest but in position to operate. As soon as the ring 70 is completely unlocked and the hooks 66 therefore positioned under the flange 67 of the upper mold half 69, the cam 102 has revolved sufficiently to operate its valve and thus admit pressure to the lower end of cylinder 63. This raises the ram-plates which causes the mold 22 to "break" and lift the upper mold section 69 from the lower 23.

The cured tire now is removed from the mold section to which it clings and a green casing 89 and bead ring 87 are placed in the lower section 23. The operator then swings the bead ring compressor over the mold section 23. During the above manual operations the cam shaft 100 has rotated sufficiently to cause the cam 102 to again operate its valve, bringing the center bracket 86 down to engage with the bead compressor which acts on the ring 87 and forces the latter into place in the tire.

The cam 102 immediately operates its valve again which raises the center bracket 86 from engagement with the bead compressor which is then swung into inoperative position. Again the same cam operates its valve to replace the upper mold section 69 on the lower section 23. With the two mold sections in closed relation, the mold locking cam 101 operates its valve, admitting pressure to the back of cylinder 79 to advance rack 80 and rotate gears 81 and 84 counterclockwise, and rotating the lock ring to tightly interlock lugs 73 and 75 of the mold sections. The hooks 66 are now directly beneath openings 115 in the flange 67 of the upper mold section 69. The ram-plate cam 102 again operates its valve which now raises the ram-plates free of any mold sections.

This completes the unloading and loading of a mold, and the turn-table indexing cam 103 now operates its valve to draw the hook 33 toward the cylinder 32. The turn-table is turned as previously described, thus bringing another mold under the loading and unloading mechanism. The hook 33 is then returned by a further operation of the cam 103 on its valve in readiness for the next rotation of the table. The cycle of operations above described is then repeated.

The molds 22 are kept under a constant heat sufficient for vulcanization of inserted casings, steam being used in the apparatus shown. This steam is brought to the molds through a circular pipe 116 leading from the hub 21 of the turn-table 20. This hub 21 is rotatably mounted on a fixed spindle 117 bored to provide a steam chamber 119 fed by a main pipe 120 through the base of the spindle 117. The steam is led from the circular pipe 116 by leads 121 to the lower mold sections 23, these in turn feeding the upper sections by flexible leads 122. Removal of condensation of the steam in the molds is provided for by a drain pipe 123 leading from the lower mold sections through a steam trap (not shown) and into a catch basin 124 shown in my case as being made integral with the spindle 117. Though I have shown the molds heated with steam, other means, such as hot water, may also be used, or the molds may be electrically heated without departing from the scope of my invention.

Figure 8:
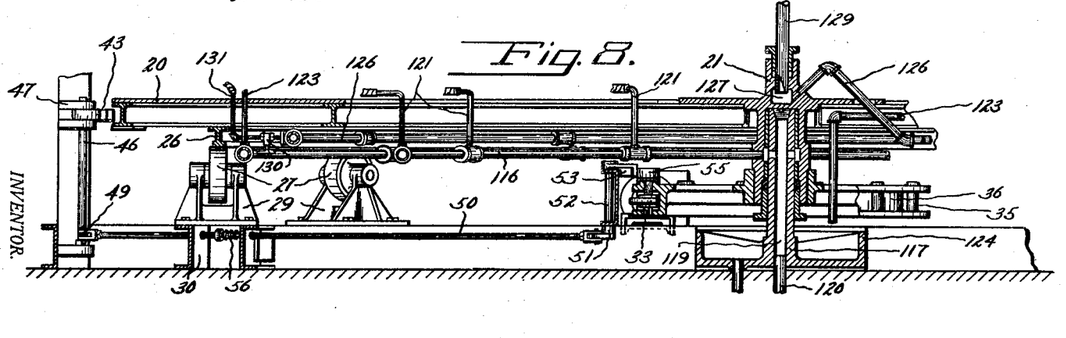
Fig. 8 is a sectional view taken substantially on line 8—8 of Fig. 7.

Tire casings 89 to be cured are supplied to the operator of the apparatus with airbags 125 which are used to inflate the tire in the mold 22. Air for the bags 125 is supplied through a circular pipe 126 led from a chamber 127 in the upper portion of the hub 21 (Fig. 8) fed by a lead 129. A valve 130 is positioned below each mold intermediate the pipe 126 and a flexible connection 131, which is clamped to the bag 125 by the operator. The valve 130 must be closed before the mold 22 is opened and before the connection 131 is removed from the airbag 125. For this purpose I have provided the valves 130 with index wheels 132.

A pin 133 is mounted in such position on the frame 30 that, just before one of the molds 22 is positioned at the station next preceding the servicing devices, it will engage with one finger 134 of the star wheel 132 on valve 130 of said mold. The direction of the turn-table 20, and consequently of the valves 130, is shown by arrows 135. By the time the turn-table 20 has completely stopped its indexation the valve 130 has been closed (Fig. 16) to the pressure and opened to the exhaust, the star wheel 132 having turned 90° from its open position (Fig. 15). Thus, during the time a mold is being serviced, the airbag 125 in the following mold is being relieved of its pressure.

After a new casing to be cured is placed within the mold 22 and all the servicing operations are completed the turn-table 20 is indexed as previously described. After the turn-table moves a short distance the wheel 132 is again rotated 90° thus re-opening the valve and inflating the airbag 125 in the new casing. This opening of the valve 130 is done automatically by a pin 136 carried by an arm 137 slidably and rotatably mounted in a sleeve 138 fixed in a boss 139 on one of the brackets 29. To hold the arm 137 so that the pin 136 will be in position to engage the star wheel I have fixed a pin 140 in the arm 137 adapted to fit into a slot 141 in the boss 139.

When a mold is to remain empty the valve for that particular mold should remain closed. To accomplish this the operator will draw the arm 137 outwardly so as to remove the pin 140 from the slot 141 and, by giving the arm 137 a sufficient rotation to remove the pin 136 from the path of the star wheel 132, locate the pin 140 in another slot 142 in boss 139. The pin 140 is firmly held in either slot 141 or 142 by a spring 143 on arm 137.

Figure 6:
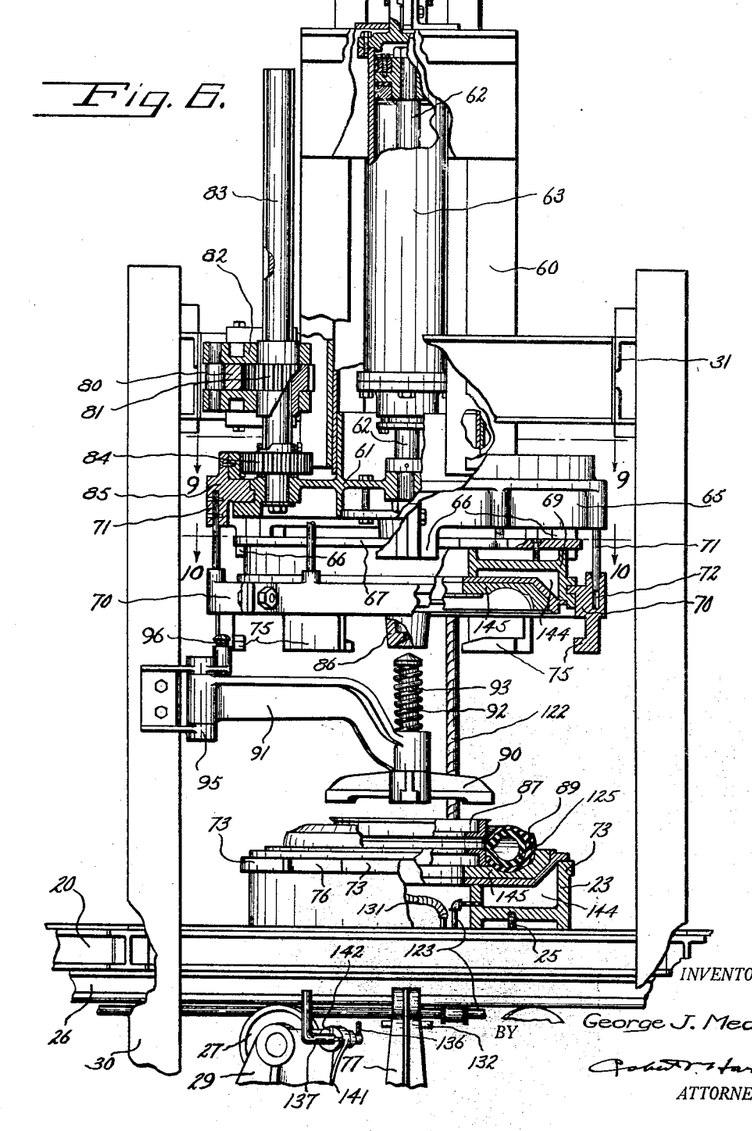
Fig. 6 is an enlarged view taken substantially on line 6—6 of Fig. 2, but with a number of parts broken away to show the operating means of opening and closing the molds.

With reference especially to Fig. 6, it will be seen that the mold sections are made up of two units. One unit comprises the steam cavity 144 and the other the mold proper 145. For changing from one size tire to another it is only necessary to remove the mold proper 145 and replace it with the desired mold cavity. Thus the connections to the molds 22 which lead to the steam cavities 144 need not be changed.

Having thus described my invention, I claim:

1. Vulcanizing mechanism which comprises a movable support, a plurality of vulcanizing molds mounted on said support, locking means carried by each mold normally holding the molds closed, mold servicing means positioned in operative relation to said conveyor, said mold servicing means including means to unlock the mold and means to open and close the molds, means to intermittently move the support to bring the molds, in successive predetermined order, into operative position with respect to the mold servicing means, and means to maintain the molds at vulcanizing temperature during their movement to and from the mold servicing means.

2. Vulcanizing mechanism which comprises a movable support, a plurality of vulcanizing molds mounted on said support, locking means carried by each mold normally holding the molds closed, mold servicing means positioned in operative relation to said conveyor, said mold servicing means including means to unlock the mold and means to open and close the molds, means to intermittently move the support to bring the molds in successive predetermined order into operative position with respect to the mold servicing means, means to maintain the molds at vulcanizing temperature during their movement to and from the mold servicing means, and timing mechanism for automatically operating the support moving means and the mold servicing means.

3. Vulcanizing mechanism which comprises a movable support, a plurality of vulcanizing molds mounted on said support, mold opening and closing means positioned in operative relation to said conveyor, means to intermittently move the support to bring the molds in successive predetermined order into operative position with respect to the mold opening and closing means, means to maintain the molds at vulcanizing temperature during their movement to and from the mold opening and closing means, and means co-operating with the mold opening and closing means during the time the mold is open to force molding rings into position on a tire positioned in the open mold.

4. Vulcanizing mechanism which comprises a movable support, a plurality of vulcanizing molds mounted on said support, mold opening and closing means positioned in operative relation to said conveyor, means to intermittently move the support to bring the molds in successive predetermined order into operative position with respect to the mold opening and closing means, means to maintain the molds at vulcanizing temperature during their movement to and from the mold opening and closing means, means co-operating with the mold opening and closing means during the time the mold is open to force molding rings into position on a tire positioned in the open mold, and timing mechanism for automatically operating the support moving means and the mold opening and closing means.

5. Vulcanizing mechanism which comprises a movable support, a plurality of vulcanizing molds mounted on said support, locking means carried by each mold normally holding the molds closed, mold servicing means positioned in operative relation to said conveyor, said mold servicing means including means to unlock the mold and means to open and close the molds, means to intermittently move the support to bring the molds in successive predetermined order into operative position with respect to the mold servicing means, means co-operating with the mold opening and closing means during the time the mold is open to force molding rings into position on a tire positioned in the open mold, and timing mechanism for automatically operating the support moving means and the mold servicing means.

6. Vulcanizing mechanism which comprises a movable support, a plurality of vulcanizing molds mounted on said support, locking means carried by each mold normally holding the molds closed, mold servicing means positioned in operative relation to said conveyor, said mold servicing means including means to unlock the mold and means to open and close the molds, means to intermittently move the support to bring the molds in successive predetermined order into operative position with respect to the mold servicing means, means to maintain the molds at vulcanizing temperature during their movement to and from the mold servicing means, means for supplying fluid pressure to the articles in the mold during the vulcanizing operation, and timing mechanism for automatically operating the support moving means and the mold servicing means.

7. Vulcanizing mechanism which comprises a movable support, a plurality of vulcanizing molds mounted on said support, locking means carried by each mold normally holding the molds closed, mold servicing means positioned in operative relation to said conveyor, said mold servicing means including means to unlock the mold and means to open and close the molds, means to intermittently move the support to bring the molds in successive predetermined order into operative position with respect to the mold servicing means, means to maintain the molds at vulcanizing temperature during their movement to and from the mold servicing means, means co-operating with the mold opening and closing means during the time the mold is open to force molding rings into position on a tire positioned in the open mold, means for supplying fluid pressure to the articles in the mold during the vulcanizing operation, and timing mechanism for automatically operating the support moving means and the mold servicing means.

8. In a vulcanizing apparatus, the combination of a rotatable support, a plurality of vulcanizing mold units mounted thereon, each of said mold units having a rotatable locking ring, means for intermittently rotating said support to bring the mold units successively to a definite station where vulcanized articles can be removed from and unvulcanized articles inserted in the molds, and a single power mechanism adjacent said station to move the locking rings to their locking and unlocking positions.

9. In a vulcanizing apparatus, the combination of a rotatable support, a plurality of vulcanizing mold units mounted thereon, each of said mold units having a rotatable locking ring, means for intermittently rotating said support to bring the mold units successively to a definite station where vulcanized articles can be removed from and unvulcanized articles inserted in the molds, and a single power mechanism adapted to detachably engage and rotate the locking rings as the mold units arrive successively at said station.

10. In a vulcanizing apparatus, the combination of a rotatable support, a plurality of vulcanizing mold units mounted thereon, each of said mold units having a rotatable locking ring, power means for intermittently rotating said support to bring the mold units successively to a definite station where vulcanized articles can be removed from and unvulcanized articles inserted in the molds, means for continuously supplying heating fluid and pressure fluid to the molds as they are carried around by the support, and a single power mechanism adapted to rotate the locking rings as the mold units arrive successively at said station.

11. In a vulcanizing apparatus, the combination of a rotatable support, a plurality of vulcanizing mold units mounted thereon, each of said mold units having a rotatable locking ring, means including a pressure cylinder for intermittently rotating said support to bring the mold units successively to a definite station where vulcanized articles can be removed from and unvulcanized articles inserted in the molds, means for continuously supplying heating fluid and pressure fluid to the molds as they are carried by the support through a complete circuit, fluid-pressure actuating means for rotating the locking rings as their respective molds arrive at said station, and means for controlling the operation of said locking ring actuating means and said support rotating means.

12. In apparatus of the class described, the combination of a turntable for supporting a plurality of vulcanizing molds to be moved successively from a definite station through a complete circuit ending at said station, a crosshead guided for reciprocation in a line substantially tangential to the turntable, means including a pressure cylinder and a plunger for reciprocating the crosshead, a pawl pivoted to the crosshead and adapted to engage portions of the turntable to propel the same in the forward movement of the crosshead, and a movable stop actuated by said pawl to arrest the movement of the turntable at the end of each propelling stroke of the crosshead.

GEORGE J. MEAD.